3,409,391
PROCESS FOR PRODUCING HIGH PURITY
COLUMBIUM OXIDE
Charles E. Mosheim, Pennsburg, Pa., assignor to Kawecki Chemical Company, New York, N.Y., a corporation of Pennsylvania
No Drawing. Filed Jan. 17, 1966, Ser. No. 520,877
3 Claims. (Cl. 23—23)

ABSTRACT OF THE DISCLOSURE

Indigenous iron contaminant in columbium oxide is removed to produce optical grade columbium oxide by reacting the contaminated oxide with oxalic acid to convert both the columbium and iron to oxalates in solution, then separating the columbium oxalate by crystallization from the iron oxalate-containing solution, and calcining the separated substantially iron-free columbium oxalate to form optical grade columbium oxide.

---

This invention relates to high purity columbium oxide and, more particularly, to a method of purifying an iron-contaminated columbium oxide to the level of optical grade.

Columbium oxide for use in making optical glass must be substantially free of contaminants which impart color to the glass. Of the indigenous contaminants of calcined columbium oxide, iron is the one that generally prevails in objectionable quantities which, at present, are considered to be amounts substantially in excess of 10 parts per million of iron, expressed as Fe by weight of the columbium content of the columbium oxide.

I have now devised a method of purifying a columbium oxide, prior to its calcination, to such an extent as to raise the purity of an iron-contaminated oxide to the level of optical grade. The method of my invention comprises reacting the iron-contaminated columbium oxide with oxalic acid in an aqueous medium to convert both the columbium and the iron components to oxalates in solution in the aqueous medium. The columbium component is then separated from the iron-containing aqueous medium by crystallization and is calcined with the resulting production of an optical grade columbium oxide.

The iron-contaminated columbium oxide which is amenable to purification by the method of the present invention is any columbium oxide which is otherwise ready for the conventional ultimate step of calcination. Such columbium oxides may be either the hydrated or dehydrated oxides. For example, where the oxide is produced by precipitation from a fluoride solution, the precipitate is the hydrated oxide, to wit, columbium hydroxide. Inasmuch as the method of the invention involves an aqueous reaction, it is immaterial whether the starting oxide is $Cb_2O_5$ or $Cb(OH)_5$ or some other oxidic form of columbium such as the sulfate or nitrate which does not introduce a contaminant that cannot be removed by calcination. The reaction between the columbium oxide and oxalic acid pursuant to the invention takes place in an aqueous medium, and thus it is of no importance whether the oxide is supplied in the wet or dry form.

The amount of oxalic acid, generally available economically in the form of oxalic acid dihydrate, should be sufficient to dissolve all of the columbium. The stoichiometric amount of oxalic acid dihydrate for this purpose is about 2.2 pounds per pound of dry $Cb_2O_5$. Somewhat more oxalic acid insures complete dissolution of the columbium, but there is no upper limit in the amount of oxalic acid used other than that of economy because any excess of oxalic acid not used in converting the columbium oxide to the oxalate is readily burned off during the final calcination of the purified columbium oxide. The concentration of the oxalic acid in the aqueous medium is also not critical but is advantageously as high as possible so as to promote rapid and complete dissolution of the columbium oxide in the aqueous medium in the form of columbium oxalate.

Dissolution of the columbium oxide in the oxalic acid solution as a result of the reaction therebetween is promoted by elevated temperatures up to the decomposition temperature of the columbium oxalate. The acid oxalate presently believed to have the formula:

$$(H_3CbO(C_2O_4)_3 \cdot 5H_2O)$$

is formed when columbium oxide is reacted simply with oxalic acid, and the decomposition temperature of this oxalate in the aqueous medium is such as to permit heating of the reaction mass to a maximum of about 80° C. However, I have found that there is an advantage in the further presence in the reaction medium of ammonium ions supplied by an addition of ammonia gas, ammonium hydroxide, or an ammonium salt such as ammonium chloride, ammonium sulfate, ammonium oxalate, or other ammonium compound which does not introduce a non-volatile impurity or cause hydrolysis of any component of the aqueous medium. The ammonium salt is added in amount sufficient, in the presence of the oxalic acid, to produce a complex ammonium columbium oxalate (presently believed to have the formula:

$$((NH_4)_3CbO(C_2O_4)_3 \cdot 5H_2O)$$

which is sufficiently soluble to effect complete dissolution of the columbium oxide at reaction temperatures up to about 95° C. without decomposition but is less soluble than the acid oxalate in the aqueous reaction mass when this mass is subsequently cooled to crystallize out the columbium component.

Inasmuch as the columbium component of the aqueous medium is to be recovered by its crystallization, it is essential to the desired high purity of the final product that it not be contaminated with any other insoluble foreign matter which might be present in the aqueous medium. Accordingly, merely as a safeguard against such contamination, it is presently preferred to filter the columbium oxalate solution while it is hot to insure removal of any solid foreign matter which may inadvertently find its way into the reaction medium.

The columbium component of the oxalate reaction mass is separated by crystallization. Crystallization is promoted by cooling the oxalate solution at least to ambient temperature and advantageously to an artificially lowered temperature of about 10°–20° C. Agitation of the reaction mass during this cooling operation promotes both cooling and crystallization. The separation of the columbium oxalate crystals, whether those of the acid or complex oxalate, is effected by filtration but may be preceded, if desired, by simple decantation. The columbium oxalate crystals are then washed to remove entrained mother liquor. Cold water is effective for this washing step but it is presently preferred to carry out the final washing operation with a lower aliphatic alcohol or acetone, or the like, which is miscible with the aqueous medium but does not significantly dissolve the columbium oxalate.

The resulting columbium oxalate, substantially free of the original iron contaminant which remains in the mother liquor, is then calcined to decompose the oxalate and to produce the dry oxide product generally required for optical purposes. This calcination, which of course takes place in clean air, can be effected at temperatures of at least about 500° C. but not above 1100° C. The present preference is for calcination under conditions which will raise the temperature of the columbium oxide product to an ultimate level of about 800°–900° C. The final calcined columbium oxide product, regardless of its initial iron content, will have an iron content not in excess of, and generally less than, 10 p.p.m. expressed as Fe by weight of Cb in the $Cb_2O_5$. Other indigenous metallic impurities whose oxalates are water-soluble are also lowered by the method of the invention if their starting levels are substantially in excess of 10 p.p.m. on a metal basis.

The following examples are illustrative of the practice of the invention:

EXAMPLE I

A columbium hydroxide filter cake, precipitated from a fluoride solution and containing 200 parts of $Cb_2O_5$, was mixed with 500 parts by weight of oxalic acid dihydrate. The pastry mass was thoroughly mixed and deionized water was added to form a thick slurry. The slurry was mixed and heated to about 70° C. to effect complete reaction between the columbium hydroxide and the oxalic acid. The hot solution was promptly filtered through a suitable filter medium to remove any foreign matter which may have been present. The clarified filtrate was cooled while being agitated to prevent caking of the columbium oxalate crystals as they formed. After the temperature of the filtrate reached 25° C., the slurry of crystals was filtered by vacuum filtration and the crystals were then washed on the filter with pure acetone. The washed columbium oxalate crystals, after separation of entrained washing acetone, were removed from the filter and were then thermally decomposed in a muffle furnace for one hour at 900° C. in an ambient oxidizing atmosphere. The yield of resulting pure $Cb_2O_5$ was about 52% of the starting material. The analysis of the columbium hydroxide starting material and of the final $Cb_2O_5$ product were as follows, expressed as the p.p.m. of the specified impurity metal on the basis of the columbium metal:

|    | Columbium hydroxide | Columbium oxide product |
|----|---|---|
| Fe | 90 | <10 |
| Ti | 10 | <10 |
| Mn | 10 | <10 |
| Al | 30 | <10 |
| Ca | 30 | <10 |
| Ta | 3,300 | 900 |

EXAMPLE II

A columbium hydroxide filter cake such as that in Example I containing 100 lbs. of $Cb_2O_5$ was added to 27.7 gals. of deionized water while under rapid agitation in an 80 gallon polyethylene-lined tank until a uniform slurry was formed. An addition of 250 lbs. of oxalic acid dihydrate was made to the slurry in order to initiate the reaction, and the mixture was heated to promote reaction between the oxalic acid and the columbium hydroxide. When the temperature reached 60° C., 50 lbs. of $NH_4Cl$ were added to the solution, and heating was continued until the $NH_4Cl$ dissolved and the temperature had been raised to 80° C. After all the ingredients had reacted, the solution was filtered into another 80 gallon polyethylene tank and the ammonium columbium oxalate solution was allowed to cool under agitation until its temperature was lowered to 25° C. The liquor was separated from the crystals by centrifuging and the crystals were washed with about 2.5 gallons of deionized water at a temperature of 5° C. to remove mother liquor from the surface of the crystals. The washed crystals were placed in quartz boats and thermally decomposed for 3 hours at 900° C. in a muffle furnace. The yield of purified $Cb_2O_5$ was 86 lbs., representing an 86% efficiency. The iron level of this $Cb_2O_5$ product had been reduced from 50 p.p.m. to less than 10 p.p.m. and the other metallic impurities were also drastically lowered.

I claim:
1. The method of purifying an iron-contaminated columbium oxide to the level of optical grade columbium oxide which comprises reacting the contaminated columbium oxide with oxalic acid in an aqueous medium to convert both the columbium and the iron components to oxalate in solution in the aqueous medium, crystallizing the columbium oxalate from the iron-containing aqueous medium, separating the crystallized columbium oxalate from the iron-containing aqueous medium, and calcining the separated columbium oxalate to form optical grade columbium oxide.

2. The method according to claim 1 in which a source of ammonium ions is added to the aqueous reaction mass in amount sufficient to form an ammonium columbium oxalate which is capable of being crystallized from the aqueous medium.

3. The method according to claim 1 in which the iron-containing columbium oxide is columbium hydroxide precipitated from a columbium fluoride solution.

References Cited

UNITED STATES PATENTS 2,481,584 9/1949 Fowler _____ 23—19
2,198,527 4/1940 Curtin.

FOREIGN PATENTS 516,880 1/1940 Great Britain.
845,746 8/1960 Great Britain.

OSCAR R. VERTIZ, *Primary Examiner.*

H. T. CARTER, *Assistant Examiner.*